US006879765B2

(12) United States Patent
Kuzma

(10) Patent No.: US 6,879,765 B2
(45) Date of Patent: Apr. 12, 2005

(54) INTEGRATED SELECTABLE WAVEGUIDE FOR OPTICAL NETWORKING COMPONENTS

(75) Inventor: Andrew J. Kuzma, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/244,190

(22) Filed: Sep. 16, 2002

(65) Prior Publication Data

US 2004/0057673 A1 Mar. 25, 2004

(51) Int. Cl.[7] .............................. H01S 3/19; G02B 6/10

(52) U.S. Cl. ......................... 385/129; 385/15; 385/130; 385/131; 372/46; 376/45; 350/96.11; 350/96.12; 350/96.13; 350/96.14; 350/96.15

(58) Field of Search .............................. 385/15–30, 37, 385/39, 40, 129–132; 350/96.11, 96.12, 96.13, 96.14, 96.15; 372/46, 50; 396/4.5

(56) References Cited

U.S. PATENT DOCUMENTS 4,728,167 A * 3/1988 Soref et al. .................... 385/16
4,787,691 A * 11/1988 Lorenzo et al. ................ 385/3
5,023,882 A * 6/1991 Paoli ........................... 372/50
5,133,037 A * 7/1992 Yoon et al. ................. 385/132
5,138,687 A * 8/1992 Horie et al. ................ 385/129
5,195,163 A * 3/1993 Burns et al. ................ 385/132
5,216,740 A * 6/1993 Schimpe ..................... 385/129
5,305,412 A * 4/1994 Paoli .......................... 385/122
5,511,142 A * 4/1996 Horie et al. ................ 385/129
5,630,004 A * 5/1997 Deacon et al. .............. 385/129
5,682,455 A * 10/1997 Kovacic et al. ............. 385/131
5,732,177 A * 3/1998 Deacon et al. .............. 385/122
5,732,179 A * 3/1998 Caneau et al. .............. 385/131
5,841,930 A * 11/1998 Kovacic et al. ............. 385/131
5,841,931 A * 11/1998 Foresi et al. ............... 385/131
5,857,039 A * 1/1999 Bosc et al. .................... 385/14
6,236,793 B1 * 5/2001 Lawrence et al. .......... 385/132
6,311,004 B1 * 10/2001 Kenney et al. ............. 385/130
6,314,228 B1 * 11/2001 Korenaga et al. ........... 385/129
6,353,690 B1 * 3/2002 Kulishov ..................... 385/10
6,449,417 B1 * 9/2002 Binkley et al. ............. 385/129
6,480,639 B2 * 11/2002 Hashimoto et al. ........... 385/14
6,522,799 B1 * 2/2003 Bazylenko et al. ........... 385/14
6,580,863 B2 * 6/2003 Yegnanarayanan et al. . 385/132
6,611,636 B2 * 8/2003 Deliwala ..................... 385/14
6,674,948 B2 * 1/2004 Yeh et al. ................... 385/120
6,674,949 B2 * 1/2004 Allan et al. ................. 385/129
2001/0041040 A1 * 11/2001 McCallion et al. ......... 385/129
2002/0021878 A1 * 2/2002 Allan et al. ................. 385/129
2003/0152354 A1 * 8/2003 Uchida ....................... 385/129
2003/0199109 A1 * 10/2003 Kuzma ........................ 438/16

* cited by examiner

*Primary Examiner*—John R. Lee
*Assistant Examiner*—David A. Vanore
(74) *Attorney, Agent, or Firm*—Marshall, Gerstein & Borun LLP

(57) ABSTRACT

An integrated selectable waveguide device is shown that compensates for misalignment problems between an output optical port and an input optical port. In one example, the output port is part of an active optical device and the input port is part of a passive optical device, and both devices are combined in a single module to form an integrated optical device. The integrated selectable waveguide device has a plurality of selectable waveguide paths that can be controllably used to route an optical signal from the active device into the passive device, though the two devices are misaligned (e.g., transversely offset) in the module. An optimum selectable waveguide path correcting for the misalignment is chosen through testing the output of the module for maximum signal intensity at each of the plurality of selectable waveguide paths.

34 Claims, 7 Drawing Sheets

100

106
116
108
112
D
104
102
114
110

INTEGRATED SELECTABLE WAVEGUIDE FOR OPTICAL NETWORKING COMPONENTS

FIELD OF THE INVENTION

The present invention relates generally to optical devices and more specifically to optical devices with reduced signal loss between optical components.

BACKGROUND OF RELATED ART

Optical networking and telecommunications systems have evolved substantially over the last five to ten years, not only in capability and efficiency, but also in complexity. Yet, while systems have evolved, the demands of the marketplace have continued to fuel the need for improvements.

One area of improvement is in the manufacture of network components. Many optical and opto-electronic devices are used in modern telecommunication networks. Optical filters, amplifiers, oscillators, arrayed waveguide gratings (AWGs), switches, and Mach-Zehnder interferometers are common examples. The manufacture of these and other devices has been an over costly endeavor in which devices are individually fabricated, often to tailor the devices to very specific applications of use. Such individual device fabrication approaches prevent device manufacturers from relying upon cost-saving batch fabrication techniques and efficient assembly techniques. These limitations also hinder the fabrication of optical modules assembled using component co-packaging, i.e., structures in which multiple components are formed within a single, integrated module. This latter limitation is particularly problematic, because optical component integration offers numerous theoretical advantages, of which device efficiency and speed are two of the most important.

Currently, a common method of creating multi-functioning optical modules, is to make discrete functioning optical components and then couple the components together through waveguide or lens couplings. Optical fiber pigtails are an exemplary means of coupling a signal from the output port of one device to the input port of another device.

Some manufacturers have produced multiple device modules, where individual devices are connected via very short optical fiber segments or miniature lenses. Such modules reduce the separation distance between devices, but, nevertheless, still limit the spacing between devices. That is, these solutions do not offer a small enough integration scale for the module. The couplers may be removed to allow free-space coupling between devices, but such coupling is incompatible with the preferred module assembly techniques.

For device assembly, manufacturers rely upon pick-and-place assembly techniques to mount the various optical devices onto a substrate. While exact component placement on the substrate is ideal, cost-effective pick-and-place assembly often results in small misalignments in device placement, i.e., the placement of devices on the substrate in positions other than the exact placement positions set-forth in the design schematic. Some of these misalignments are large enough to affect the coupling between individual devices within a module. In fact, one of the advantages of fiber and lens couplers is that they may correct for these misalignments between devices due to pick-and-place assembly, while free-space coupling does not correct for such misalignment. The problem is that using known couplers reduces module integration by increasing the spacing between the devices in the module. Furthermore, these couplers themselves must be manufactured separately from the optical devices to be placed in the module.

Alignment of the various devices in an optical module can be optimized but only by using expensive alignment techniques. Alignment between devices may be done manually or with the aid of very precise machine vision systems. These solutions slow device manufacture times substantially and are costly. Alignment may be achieved by using automated pick-and-place assembly techniques that are automated for a very high degree of accuracy, but again this slows the assembly process and adds substantial cost.

DETAILED DESCRIPTION OF PREFERRED EXAMPLES

Provided are numerous methods, and structures formed from the same, that address the above-described problems. While preferred examples and numerous alternatives thereto are provided below, it will be appreciated by persons of ordinary skill in the art that these are exemplary in nature. The teachings herein may be used to form a great many integrated optical devices. Furthermore, while the approaches are described in the context of forming integrated optical devices, the teachings herein may be applied to other optical networking components both integrated and single device structures.

Figure 1:
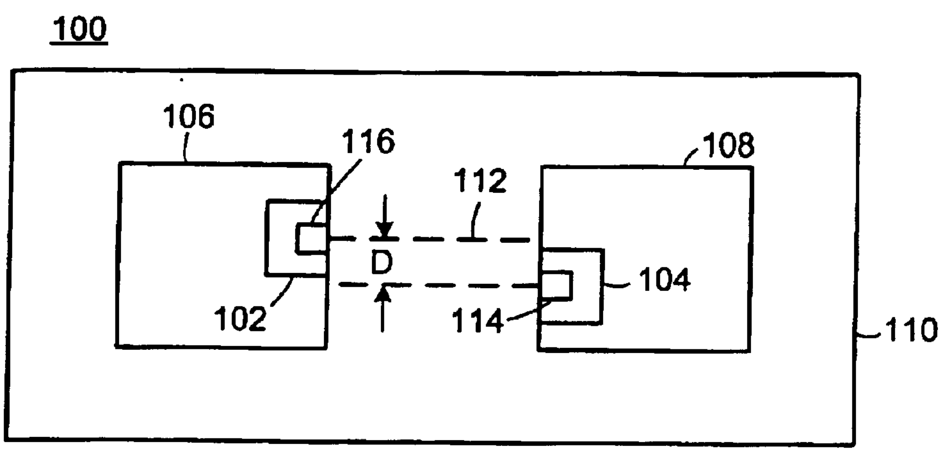
FIG. 1 is an illustration of a two optical device structure in which the two optical devices are misaligned.

FIG. 1 is an illustration of a portion of an opto-electronic module 100. The module 100 includes a first optical device 102 and a second optical device 104. These optical devices 102 and 104 are generally shown and may represent passive and/or active optical devices. For example, the optical device 102 may represent an active or transmitting device, such as a laser or optical amplifier, and the optical device 104 may represent a passive or receiving device, such as a thin film filter or an optical filter, of which etalons, resonators, and photonic crystals are but a few examples. In this example, device 102 is an output signal producing device and device 104 receives that output signal.

Devices 102 and 104 are positioned on dies 106 and 108 respectively. As will be understood by persons of ordinary skill in the art, such dies are used for mounting optical devices with dimensions too small for placement using standard pick-and-place assembly techniques. The dies are larger in size than their corresponding optical devices (e.g., 250 $\mu$m in square dimensions in plan view) and are more easily positioned and assembled into an optical module. Suitable die materials like Indium Phosphide (InP), Silicon Germanium (SiGe), and Gallium Arsenide (GaAs) are known. The two dies 106, 108 are mounted on a substrate 110 using standard pick-and-place techniques to form the integrated module 100.

The illustration in FIG. 1 depicts the situation in which the die 106 and the die 108 have been mounted in a misaligned manner. That is, the dies 106 and 108 have been mounted on the substrate 110 such that an output signal from device 102, represented by line 112, will not couple directly into input port 114 of optical device 104. The output signal 112 is misaligned from the input port 114 by a misalignment distance, D, also termed herein a transverse offset between a first device or path and a second device or path. The misalignment distance, D, represents the normal distance between a vertical plane bisecting the input port 114 and a vertical plane bisecting an output port 116 providing optical signal 112. The misalignment may not only result from die misplacement, but also from improper mounting placement of the devices 102 and 104 onto the respective dies 106 and 108. In any event, such displacement, even if only minor, will result in degraded operation of the optical module 100, as the output signal from device 102 will not properly couple into the input port 114 of device 104.

Figure 2:
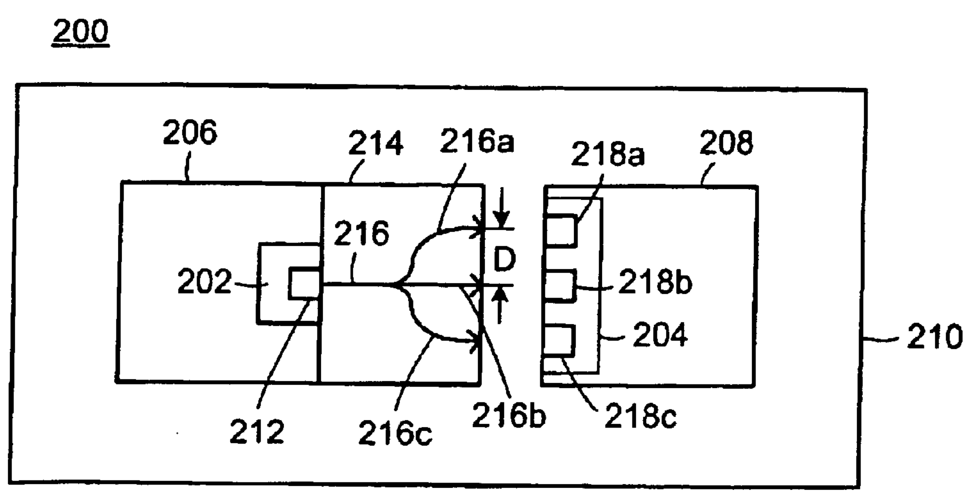
FIG. 2 is an illustration of a two optical device structure having a selectable waveguide device constructed in accordance with an example.

FIG. 2 illustrates an exemplary integrated optical module 200 like that of the optical module 100, except the module 200 is constructed in accordance with the present teachings. Module 200 is generally formed of a first optical device 202 and a second optical device 204, each optical device is mounted on a die 206 and 208, respectively, and each of the dies 206 and 208 are mounted on a substrate 210. The substrate 210, as with substrate 110 may be a ceramic substrate, a polymer substrate, or other suitable substrate material. A heat dissipating and electrically insulative material may be used. The optical device 202 includes an output port 212, which may be a waveguide. An optical signal from the port 212 is coupled to a selectable waveguide device 214 that corrects for the misalignment errors like those shown in FIG. 1.

In the depicted example, the selectable waveguide device 214 is integrated with die 206 and device 202 such that all of the energy of output signal 216 from device 202 is coupled into the selectable waveguide device 214. As it will be appreciated by persons of ordinary skill in the art, the selectable waveguide device 214 need not be formed integrated with these structures, but rather may be formed separated from these structures or integrated with other devices, if so desired.

The selectable waveguide 214 has three selectable waveguide paths 216*a*, 216*b* and 216*c*, which are used to correct for misalignment between the positioning of the output port 214 and input port 218 of device 204. Three exemplary locations for the input port 218 are shown in reference numerals 218*a*, 218*b* and 218*c*.

In operation, if there is no misalignment between the output port 212 and the input port 218, for example at input port position 218*b*, then the output signal 212 propagates along selectable waveguide 216*b*. The path defined by selectable waveguide path 216*b* is termed the nominal path (or +0 offset path), as it involves no alignment correction. If there is a first misalignment between the output port 212 and the input port 218 (e.g., with the input port at position 218*a*) then the selectable waveguide device 214 is controlled to couple the output signal 212 into selectable waveguide path 216*a*, which corrects for this misalignment. The selectable waveguide path 216*a* has a maximum separation distance, D, from the nominal path, and the misalignment distance between the output port 212 and the input port 218*a* is also D. The optical path defined by the selectable waveguide 216*a* is termed a +1 transverse offset. If there is a second misalignment between the output port 21 and the input port 218 (e.g., with the input port at position 218*c*) then the selectable waveguide device 214 is controlled to couple the output signal 212 into selectable waveguide 216*c*, which corrects for this misalignment. In the illustrated example, selectable waveguide path 216*c* has a maximum separation distance, D, from the nominal path, making selectable waveguide paths 216*a* and 216*c* symmetric about the nominal path. The optical path defined by the selectable waveguide 216*c* is termed a −1 transverse offset.

Figure 3:
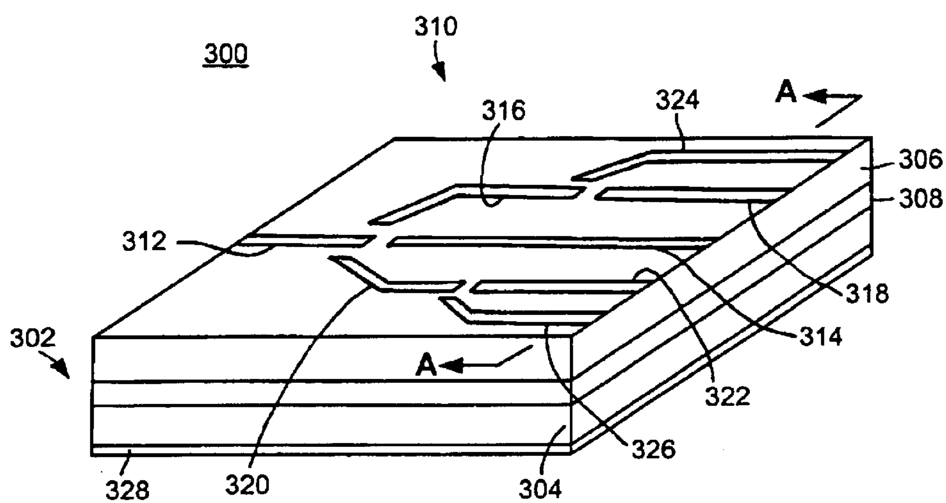
FIG. 3 is an illustration of a selectable waveguide device having an electrode array, in accordance with an example.

FIG. 3 is a detailed illustration of a selectable waveguide device 300 having multiple selectable waveguide paths. The selectable waveguide device 300 has a multilayer substrate 302 including a lower cladding region 304, an upper cladding region 306 and a propagation layer 308. The cladding regions 304 and 306 may be formed of n-doped or p-doped InP, and propagation layer 308 may be formed of an optically transparent material that exhibits an electric field dependent index of refraction. Suitable materials for the propagation layer 308 include InP, GaAs and SiGe. The substrate 302 may be formed through known layer growth techniques.

In the illustrated example, any output signal from an optical device propagates through the propagation layer 308 under a substantially lossless total internal reflection propagation off of the cladding region boundaries. In the example shown, the materials used to form propagation layer 308 have the property that their index of refraction may be changed by applying an electrical field across portions of the propagation layer 308. The materials exhibits a bandgap energy near, but slightly above, the frequency of the optical signal that is to propagate through the propagation layer 308, typically either around 1310 or around 1550 nm. The upper cladding 306 and lower cladding 304 may be formed of a material that does not exhibit a change in index of refraction upon application of an electrical field.

To form the individual selectable waveguide paths, an electrode pattern 310 is formed on the top surface of substrate 302, for example, through a conventional metal deposition process. The electrode pattern 310 includes electrodes 312, 314, 316, 318, 320, 322, 324 and 326. Each of these electrodes may be individually connected to control circuitry that controllably alters the index of refraction of a portion of the propagation layer 308 to define the various selectable waveguide paths. A ground plane layer 328 is shown on the bottom surface of substrate 302.

Figure 4:
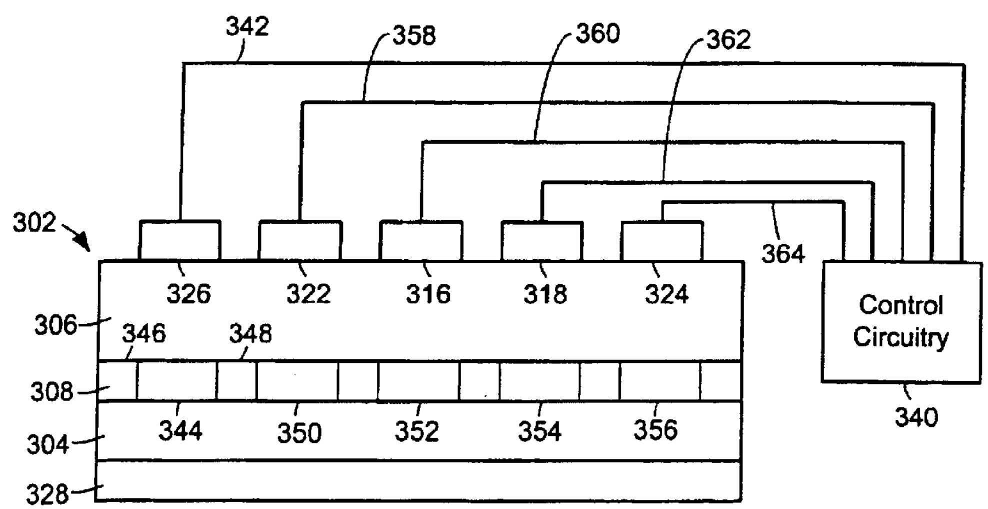
FIG. 4 is an cross-sectional illustration looking along lines A—A of FIG. 3.

An exemplary block illustration of electrode control, in cross section looking into line A—A, is shown in FIG. 4. When an electric current is applied by control circuitry 340 to conductor 342, an electric field is applied across a portion of propagation layer 308 under electrode 326, thereby defining a waveguide region 344. The waveguide region 344 has a second index of refraction—in comparison to the non-effected regions therein—that changes with changes in electric field created by the electrode 326. By way of example and not limitation, a negative 3–4 volts could be applied to the electrodes to affect the desired reduction in the index of refraction of the waveguide region 344 (e.g., an approximate 2% change), though, depending on the index of refraction of the various regions, a positive voltage and/or a voltage of different magnitude may alternatively be applied. The index of refraction in waveguide region 344 changes in response to the application of the electric current resulting in a lower index of refraction than the surrounding upper cladding region 306, lower cladding region 304 and unchanged regions 346 and 348. A similar index change is induced to form waveguide regions 350, 352, 354 and 356 by applying electrical current to electrical leads 358, 360, 362 and 364, respectively. Each of the optical waveguide regions 344, 350, 352, 354 and 356 extend into and out of the illustration below electrodes 326, 322, 316, 318, and 324 respectively. The electrodes 326, 322, 316, 318, and 324 may be 6–10 μm in width, for example, and the width of the correspondingly formed waveguide regions is approximately the same. The electrode width may be larger or smaller. Signal propagation is confined to the waveguide regions due to the change in index of refraction therein. In fact, the waveguide regions 344, 350, 352, 354 and 356 define the selectable waveguide paths formed by the electrode pattern 310. The control circuitry 340 is implemented in a known manner.

The illustrated layered substrate 302 is only exemplary in nature. Additional and/or different substrate layers may be provided. For example, the propagation layer 308 may have a multi-layer quantum well configuration for finer mode confinement of a propagating optical signal. And the Quantum well layers may be doped to allow for large changes in the index of refraction.

Figure 5:
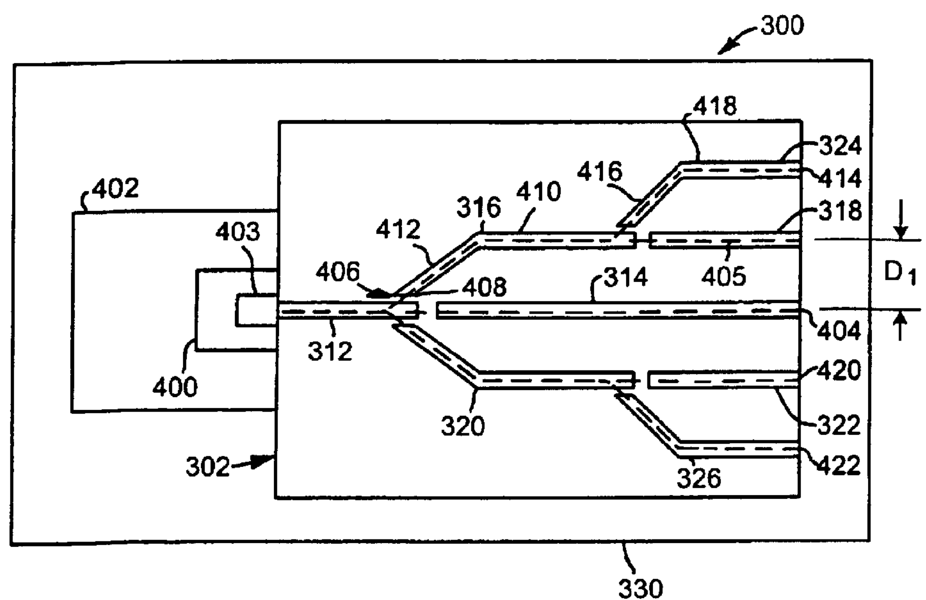
FIG. 5 is a top view of an exemplary selectable waveguide device and optical device.

FIG. 5 depicts a top view of the selectable waveguide device 300 mounted on a substrate 330 and coupled to a first optical device 400 on a die 402 also mounted on the substrate 330. The substrate 330 may be a ceramic substrate though other more general substrate materials such as polymers or silicon work bench are suitable.

In operation, electrode 312 is high, i.e., receiving a voltage signal, to define a waveguide region in that portion of the propagation layer 308 below the electrode 312. The electrode 312 may be positioned to allow full coupling of the optical signal from an output port 403. The electrode 312 and electrode 314 define a nominal (or +0 order) propagation path for the optical signal, i.e., an optical path that has not been adjusted by the electrode pattern 310, the direction of which is shown by dashed line 404. However, to couple the optical signal from the nominal path 404 to a +1 transverse offset path 405, electrodes 316 and 318 would be energized thereby resulting in a coupling of the optical signal along the selectable waveguide path shown by dashed lines 412. All adjacent electrodes are within coupling distance. For example, electrode 316 is within a propagation-layer-defined evanescent coupling distance to electrode 312, and electrode 318 is within a similar evanescent coupling distance to electrode 316, such that when a waveguide region is formed having a second index of refraction, coupling will occur, as necessary, to route the optical signal along the optimum selectable waveguide path. In the illustrated example, however, all electrodes are electrically isolated from one another.

Coupling from a waveguide region below electrode 312 into the waveguide region below waveguide 316 occurs via evanescent coupling over region 404. The efficiency of such evanescent coupling may be maximized by placing an end portion 408 of the electrode 316 within a desired proximity to the region 406, i.e., the electrodes may be formed with less spacing between adjacent electrodes by the patterning or deposition process. Also evanescent coupling efficiency may be maximized by applying a sufficiently high voltage to the electrode 316, as will be understood by persons of ordinary skill in the art.

Electrode 316 has a first segment 410 and a second tap segment 412 having the proximal end 408. The gradient of the tap segment 412, as measured from the nominal path 400, determines the offset distance, D1. The gradient of the segment 412 is also chosen to reduce any bending losses of the coupled optical signal as it propagates from a waveguide region defined by electrode segment 412 into a waveguide region defined by electrode segment 410. To couple an optical signal into a+1 offset misalignment correction path, i.e., along selectable waveguide path 405, electrodes 312, 316, and 318 are energized and all other electrodes of the pattern 310 are not energized.

To couple the optical signal into a +2 offset, i.e., along selectable waveguide path 414, only electrodes 312, 316, and 324 would energized. Electrode 324 is formed of a first electrode segment 416 and a second electrode segment 418. Thus, an optical signal is coupled from path 400 into path 402 and subsequently into path 414 for +2 offset output.

In the illustrated example, the electrode pattern 310 is symmetric about the nominal path 400, and, therefore, persons of ordinary skill in the art will understand that the descriptions provided above with respect to the +1 and +2 offset paths 405 and 414 would correspondingly apply to the structure coupling an optical signal into the −1 and −2 offset paths 420 and 422. Therefore, further description of these structures will not be provided herein.

The electrode pattern 310 of FIG. 5 depicts a 1×5 coupling array in which an optical signal may be coupled into any one of five output paths. Nevertheless, the array could be more complex allowing the optical signal to be coupled into any number of offset paths. Furthermore, while the +/−1 and +/−2 offset paths are symmetric, this need not be the case.

Figure 6:
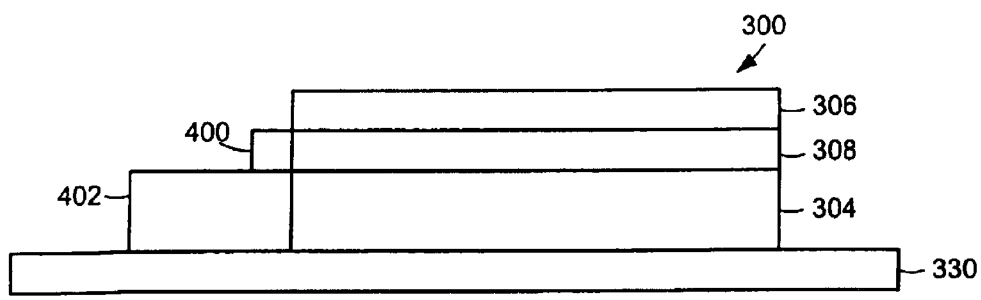
FIG. 6 is a side view of the structure of FIG. 5.

A side view of the structure of FIG. 5 is shown in FIG. 6, where the vertical heights of the various layers in the preferred selectable waveguide device 300, as measured from the substrate 330, are shown. The lower cladding region 304 extends from the top surface of the substrate 330 a height equal to that of the die 402. Such a planar relationship between the top surface of the die 402 and the under cladding 304 allows for proper vertical alignment of the output signal from optical device 400 into a propagation layer 308.

While in the depicted example, the selectable waveguide 300 is formed separately from the die 402 and optical device 400, it is contemplated that, depending on the material of the die 402, the die 402 and the under cladding 304 may be formed within a single fabrication process and of the same material. Similarly, device 400 and propagation layer 308 may be formed on the top surface of this monolithic layer through known fabrication techniques. In fact, it may be advantageous to form an entire integrated structure having an optical device and/or supporting die integrated with, and formed during the fabrication process of, the selectable waveguide device.

There are various techniques for determining the desired offset path that corrects for a misalignment between two or more optical devices, also termed the optimum selectable waveguide path. Generally, a test jig or probe station with multiple probes may be used to power the optical devices and the electrodes of the selectable waveguide device. Each of the electrodes of the electrode pattern are coupled to a controller/processor (e.g., through a multiple probe jig) that systematically applies a voltage to the electrodes along each of the possible selectable waveguide paths, including the nominal path. The controller/processor determines which electrode energizing pattern, i.e., which selectable waveguide path, results in the most intense output signal at the detector. This optimum selectable waveguide path corresponds to the appropriate offset that corrects for any misalignment. The controller/processor executes an algorithm to run through all possible offset paths.

Figure 7:
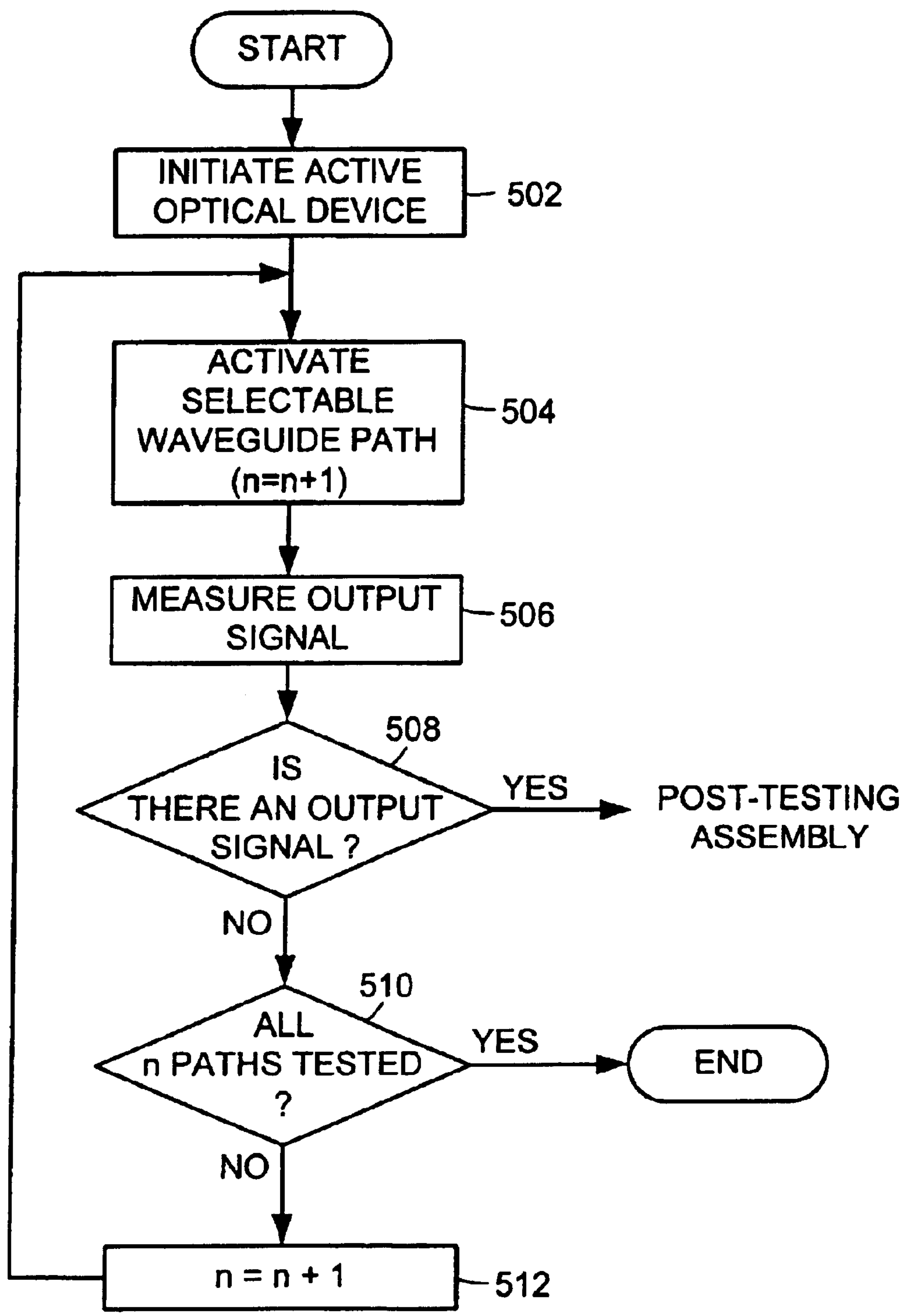
FIG. 7 is an illustration of programming for determining a desired selectable waveguide path.

In one example, illustrated in FIG. 7, a process, algorithm, or program routine starts, and an active optical device (e.g., device 400) is activated by a block 502. The program routine may be implemented through known techniques, such as control circuitry or a microprocessor, either mounted with the selectable waveguide device or remote thereto. The routine is initialized to test a first selectable waveguide path, activated by block 504, by activating all electrodes forming that path.

A detector is positioned to detect the output signal from the second device or the furthest downstream optical device, if more than two optical devices are used. Block 506 measures for the output signal. Block 508 determines if there is an output signal. If there is an output signal, control is passed to automated post-testing assembly functions, such as, hard-wiring the optimum selectable waveguide path offset pattern by forming the necessary electrical leads for optimum path electrodes. Known wire bonding or die bonding equipment are used to perform the hard-wiring and to further automate integrated module fabrication. Alternatively, post-testing assembly may include providing wire-bonds to all electrodes for energizing any selectable waveguide path, with the module set-up to determine the optimum selectable waveguide path each time the module is turned on no matter which path it is. The latter configuration may add desired flexibility for some applications, as thermal stress in certain environments may alter device alignment/misalignment over time. Wire-bonding or die bonding in this example would connect all electrodes for control and, after the controller/processor algorithm is complete, the particular electrodes needed to correct for misalignment would be energized during device operation.

If there is no output signal detected, block 508 passes control to block 510, which determines if all selectable waveguide paths have been activated. If so, the process ends and an error message may be provide. But if un-activated selectable waveguides remain, control passes to increment block 512 which then returns the routine to repeat starting with block 504.

In the illustrated example, the selectable waveguide devices are operated in a digital mode in which an electrode is either fully energized or receives no signal from the controller/processor. An analog control of the selectable waveguide devices, in which the voltage applied across an electrode is varied throughout the supply voltage range, is also contemplated.

Figure 8:
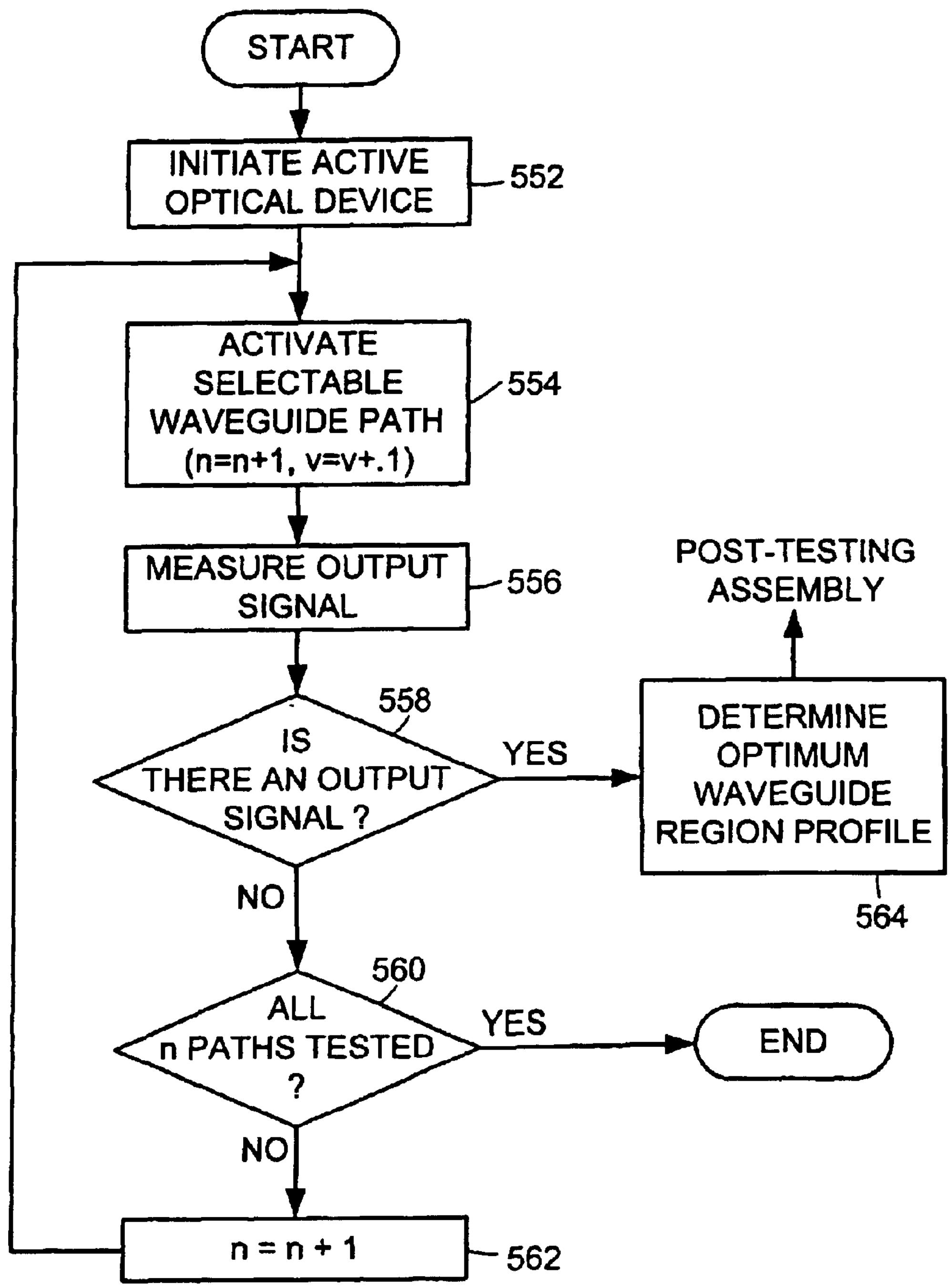
FIG. 8 is an illustration of alternative programming for analog control.

An exemplary analog control algorithm or programming routine, as may be implemented by control circuitry, a microprocessor, or other conventional techniques, is shown in FIG. 8. In operation, the routine starts and the active optical device is activated by block 552. The routine is initialized to test a first selectable waveguide path (e.g., n=0) that has been activated by block 554 by activating all electrodes forming that path with the supply voltage, e.g., the highest voltage in the analog range of voltages that may be applied. Block 556 detects for any output signal resulting from the activation of this first path. If there is no output signal, then, in the illustrated programming, it is presumed that this selectable waveguide path is not the optimum waveguide path and no subsequent activation at other voltages is performed. Block 558 passes control to block 560, which determines if all selectable waveguide paths have been tested. If yes, the programming routine ends, possibly with an error message. If not, an increment block 562 is activated and control then passes to block 554 for repeating that part of the routine.

In the illustrated example, if there is an output signal detected by block 558, then the corresponding selectable waveguide path is the optimum one, and control passes to block 564, which determines the optimum voltage to be applied to the electrodes of the preferred selectable waveguide path. That is, block 564 determines the optimum waveguide region profile by determining an optimum electrode voltage. The programming associated with block 564 is implemented in known ways, for example, through iteratively changing the applied voltage and detecting the resulting changes in intensity of the output signal until a highest-intensity output signal is found.

With the optimum selectable waveguide path and output drive voltage determined, the routine passes control to a separate process or routine that performs any necessary post-testing assembly such as trimming of resistors and hard-wiring of the leads for the electrodes corresponding to the optimum path, though, as provided above, hard-wiring (or other coupling techniques) may be done to all electrodes. The programming routine then ends.

As will be apparent to persons of ordinary skill in art, analog control may be run after the desired selectable waveguide path has been determined under the digital control mode described above with respect to FIG. 7 or the analog control mode may entirely replace the digital mode. Further, the illustrated analog control is merely an example, the programming blocks may execute in a different order and may be eliminated or replaced as desired.

Various suitable analog circuits will be known to persons of ordinary skill in the art. For example, a separate operational-amplifier control stage may be used for each electrode along a selectable waveguide path or a single control stage may simultaneously control all electrodes along the selectable waveguide path. In a hybrid circuit, for example, the analog control circuit is formed on the substrate and controlled via circuit pads.

Figure 9:
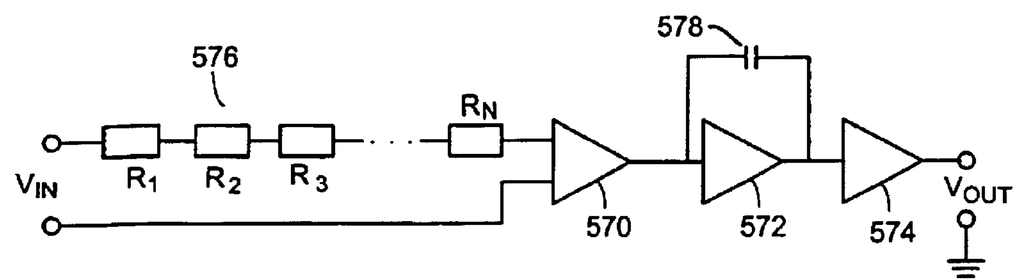
FIG. 9 is a circuit diagram of an analog control circuit, in accordance with an example.

FIG. 9 shows a portion of an example analog control circuit that may be used to supply a variable potential difference across a propagation layer of a selectable waveguide device. The analog control circuit may include a first operational amplifier (op-amp) 570, a second op-amp 572, and a third op-amp 574.

The op-amp 570 is a differential-input transconductance amplifier that receives a differential input signal in the form of a voltage, $V_{in}$. The differential input is passed across a resistor ladder network 576 that has an adjustable resistance that allows control of the amount of $V_{in}$ input to the amplifier. As a result, by varying the resistance of the resistor ladder network 576, various levels of drive voltage will be applied to the electrodes. The resistor ladder network 576 may take known forms and is shown, by way of example, as including individual resistors $R_1$, $R_2$, $R_3$. . . $R_N$ in series.

Current from op-amp 570 is fed to op-amp 572, a voltage amplifier having a feedback capacitor 578 that stabilizes the amplified output provided to the unity gain op-amp 574. The output from the op-amp 574, $V_{out}$, may be supplied to an electrode of the selectable waveguide device. The value of $V_{out}$, therefore, depends upon the resistance value of the resistor ladder network 576. This resistance value may be adjusted in known ways. For example, circuitry may adjust the resistance value of the network 576 during operation of the selectable waveguide device. Alternatively, the resistance value may also be fixed, for example, if the desired selectable waveguide path that corrects for misalignment error has already been determined and will not change.

Regarding the latter, in the hybrid circuit example, thick or thin-film resistor arrays on the circuit may be trimmed to a desired amount using techniques such as highly accurate machine vision resistor trimming techniques. Also, Ultraviolet (UV) laser light trimming techniques may be used to trim small geometry resistors. Numerous other resistor trimming implementations are possible, including manual trimming using a test jig, local trimming using a processor on the hybrid circuit, or remote trimming using a network or external circuit to control a local processor that sets the trim.

Figure 10:
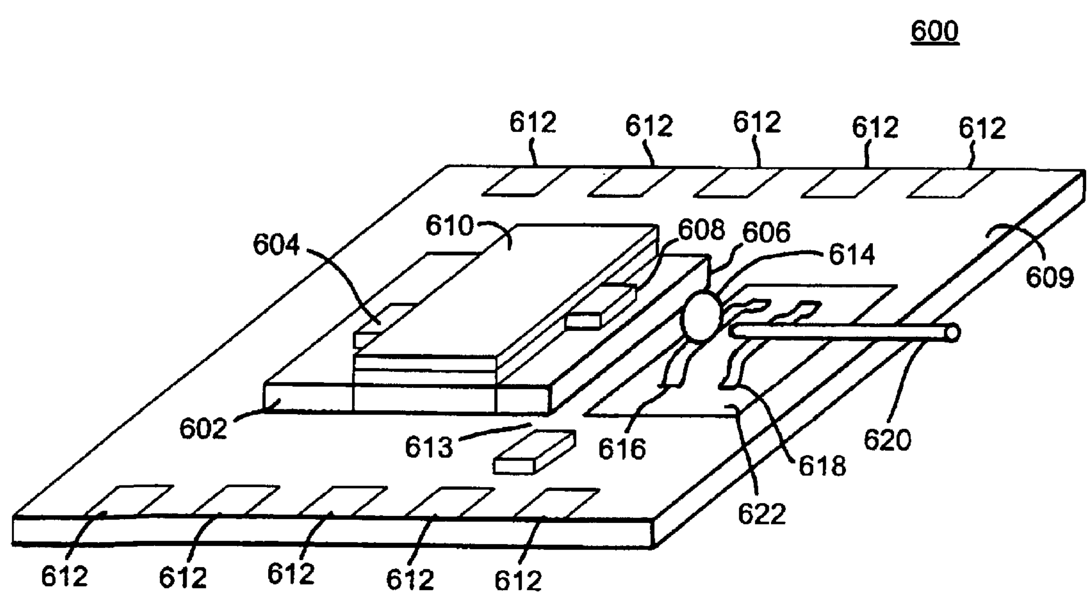
FIG. 10 is an illustration of an exemplary hybrid circuit having two optical devices and a selectable waveguide device.

Hybrid integrated optical circuits, having any number of optical devices, may be formed having the selectable waveguide devices described herein. FIG. 10 shows an exemplary hybrid optical circuit 600 having a first die 602 and first optical device 604 disposed thereon, as well as a second die 606 supporting a second optical device 608. As optical device 604 is a source device a selectable waveguide device 610 is positioned between the first optical device 604 and the second optical device 606 to ensure proper coupling of the output signal from device 604 into device 608. In the depicted example, substrate 609 is provided with a plurality of circuit pads 612 that are connected to external circuitry through a can (see FIG. 11). The circuit pads 612 are connected to the selectable waveguide 610 and any of the other active devices on the circuit 600.

The hybrid circuit 600 also includes control circuitry 613, which may be digital or analog, for operating the selectable waveguide device 610. If the hybrid circuit 600 is designed to test for the optimum selectable waveguide path upon start-up, than the control circuit (e.g., a microprocessor) is connected to each electrode in the electrode pattern of the selectable waveguide device. If the hybrid circuit 600 is hard-wired for use on a single selectable waveguide path, the electrodes along the optimum selectable waveguide path are connected to the circuit pads directly or through a straightforward amplifier circuit.

To couple the output from the hybrid circuit 600, a lens 614 is mounted on a flexure 616, which for example may be a gold flexure as is known in optical transmitter receiver modules. A subsequent flexure 618 supports an optical fiber 620. The flexures 616 and 618 are mounted on a substrate 622.

Figure 11:
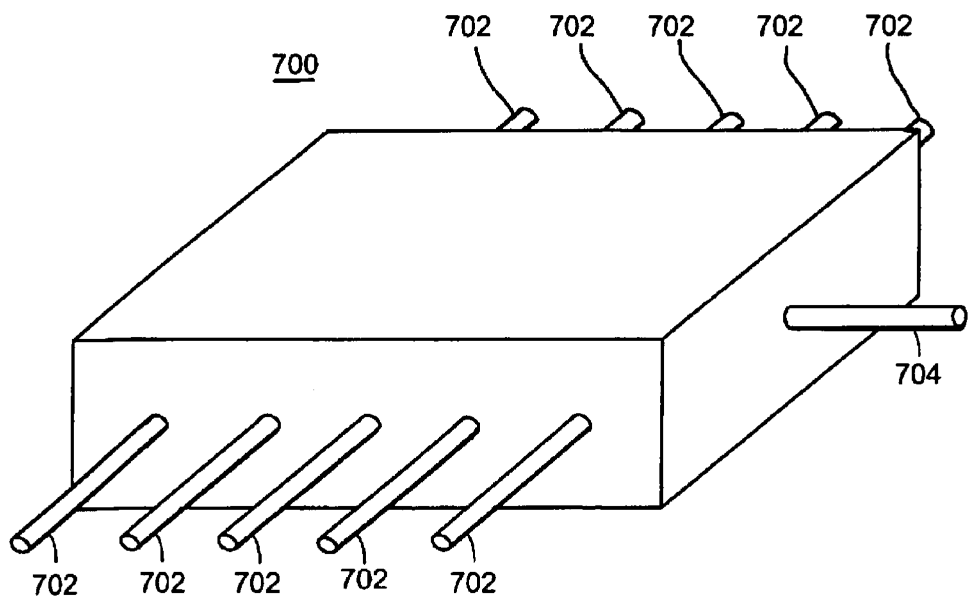
FIG. 11 is an illustration of a can for hermetically packaging the hybrid circuit of FIG. 8.

FIG. 11 shows a can 700 for hermetically sealing the integrated optical device 600 to form an integrated optical module. Such cans are used in traditional hybrid circuit applications. The can 700 may be formed of known materials, such as aluminum. The can 700 has a plurality of electrode leads 702 for connecting the circuit pads 612 to external control circuitry. Further, the can 700 has an optical fiber support cylinder 704 through which the optical fiber 620 extends. Though not shown, in the preferred example, the optical fiber 620 forms part of a pigtail having a suitable end connector connected to the optical fiber.

Although certain apparatus constructed in accordance with the teachings of the invention have been described herein, the scope of coverage of this patent is not limited thereto. On the contrary, this patent covers all embodiments of the teachings of the invention fairly falling within the scope of the appended claims either literally or under the doctrine of equivalents.

What I claim is:

1. A selectable waveguide device comprising:

a substrate having an upper cladding layer with a top surface, a lower cladding layer, and a propagation layer between the upper cladding layer and the lower cladding layer for propagating an optical signal, the propagation layer having a first index of refraction; and a plurality of electrodes formed on the top surface such that, upon energizing at least one of the electrodes, the at least one of the electrodes forms at least one waveguide region within the propagation layer, the at least one waveguide region having a second index of refraction, where the at least one waveguide region defines an offset waveguide path for selectively routing the optical signal from a nominal optical path.

2. The selectable waveguide device of claim 1, having at least a first waveguide region and a second waveguide region defining a first offset waveguide path and a second offset waveguide path, respectively, both the first offset waveguide path and the second offset waveguide path being symmetric about the nominal optical path and coupled thereto to receive the optical signal.

3. The selectable waveguide device of claim 1, wherein the upper cladding region and the lower cladding region are formed of a material with an index of refraction that is substantially constant under application of an electric field.

4. The selectable waveguide device of claim 1, wherein the optical signal is received from an optical device and wherein the propagation layer is adjacent the optical device to couple the optical signal into the nominal optical path.

5. The selectable waveguide device of claim 1, wherein the at least one waveguide region has a width substantially equal to the width of the at least one of the electrodes forming the at least one waveguide region.

6. The integrated selectable waveguide device of claim 5, wherein the propagation layer is formed of a doped InP, SiGe, or GaAs material.

7. The selectable waveguide device of claim 1, further comprising a control circuit for controllably routing the optical signal to one of the plurality of selectable output paths.

8. The selectable waveguide device of claim 7, wherein the control circuit operates in a digital control mode.

9. The selectable waveguide device of claim 7, wherein the control circuit operates in an analog circuit mode.

10. An integrated optical circuit comprising:

a first optical device providing an optical signal at an output port;

a second optical device having an input port, the input port having an offset from the output port; and a selectable waveguide device coupled between the output port of the first optical device and the input port of the second optical device, the selectable waveguide device including a propagation layer having a first index of refraction and a plurality of electrodes located adjacent the propagation layer such that, selectively energizing a subset of the electrodes, creates a waveguide region that defines a waveguide path having a second index of refraction to correct for the offset.

11. The integrated optical circuit of claim 10, wherein the first optical device is an active device and the second optical device is a passive device.

12. The integrated optical circuit of claim 10, wherein the first optical device is disposed on a first die positioned on a substrate and wherein the second optical device is disposed on a second die positioned on the substrate.

13. The integrated optical circuit of claim 10, wherein the selectable waveguide device is positioned on the substrate such that the optical signal is coupled into the propagation layer for propagation along a nominal path, and wherein a plurality of waveguide paths are created by the electrodes, the plurality of waveguide paths including a first offset path and a second offset path, both coupled to the nominal optical path to receive the optical signal.

14. The integrated optical circuit of claim 13, wherein the second offset path and the first offset path are symmetric about the nominal optical path.

15. The integrated optical circuit of claim 10, wherein the selectable waveguide device comprises an upper cladding region and a lower cladding region both formed of a material with an index of refraction that is substantially constant under application of an electric field.

16. A hybrid optical circuit comprising:

a first optical device providing an optical signal at an output port;

a second optical device having an input port, the input port being offset from the output port;

a selectable waveguide device coupled between the output port of the first optical device and the input port of the second optical device, the selectable waveguide device including a propagation layer having a first index of refraction and a plurality of electrodes located adjacent the propagation layer such that selectively energizing a subset of the electrodes creates a waveguide path having a second index of refraction to correct for the offset;

a substrate upon which the first optical device, the second optical device, and the selectable waveguide device are mounted; and a control circuit mounted on the substrate and coupled to the selectable waveguide to select the subset of electrodes to create the waveguide path.

17. The hybrid optical circuit of claim 16, wherein the control circuit is a digital circuit which selects the subset by applying either a first voltage or no voltage to each of the electrodes.

18. The hybrid optical circuit of claim 16, wherein the control circuit is an analog circuit supplying a range of voltages, between a first high voltage and a second low voltage, to each of the electrodes; such that the waveguide regions may have any of a range of values for the second index of refraction.

19. The hybrid optical circuit of claim 16, wherein the substrate comprises a plurality of circuit pads for coupling the selectable waveguide device to a voltage source.

20. The hybrid optical circuit of claim 19, further comprising a can hermetically sealing the integrated optical circuit, the can including a plurality of electrode leads coupled to the circuit pads and an optical fiber support through which an optical fiber couples an output signal from the integrated optical circuit.

21. The hybrid optical circuit of claim 16, wherein the substrate is formed of a ceramic material or a silicon workbench material.

22. A method of correcting the offset between an optical signal from a first optical device and an input port of a second optical device, the method comprising:

providing a selectable waveguide device between the first optical device and the second optical device, the selectable waveguide device having a propagation layer of a first index of refraction and having a plurality of electrodes located adjacent the propagation layer such that, upon application of voltage to the electrodes, the electrodes form waveguide regions within the propagation layer of a second index of refraction, the waveguide regions defining a plurality of selectable waveguide paths;

coupling the optical signal into the propagation layer for propagation along a nominal optical path; and applying a voltage signal to a subset of the plurality of electrodes to selectively couple the optical signal from the nominal optical path into one of the plurality of selectable waveguide paths, such that the optical signal is coupled into the second optical device.

23. The method of claim 22, wherein coupling the optical signal further comprises forming at least one waveguide region along the nominal path and adjacent an output port of the first optical device, the output port supplying the optical signal.

24. The method of claim 22, wherein applying the voltage signal further comprises:

providing a detector to measure an output signal derived from the second optical device;

sequentially activating the plurality of selectable waveguide paths;

in response to the sequential activation of the plurality of selectable waveguide paths, measuring the output signal resulting from each of the plurality of selectable waveguide paths;

determining an optimum selectable waveguide path that optimizes the output signal; and applying a voltage to the electrodes that form the optimum selectable waveguide path.

25. The method of claim 24, wherein sequentially activating the plurality of selectable waveguide paths comprises sequentially applying the voltage to each of the plurality of electrodes until each of the plurality of selectable waveguide paths has been activated.

26. The method of claim 24, wherein measuring the output signal comprises measuring the intensity of the output signal resulting from each of the plurality of selectable waveguide paths.

27. The method of claim 26, wherein determining the optimum selectable waveguide path comprises determining which selectable waveguide path resulted in the highest intensity for the output signal.

28. The method of claim 24, wherein sequentially activating the plurality of selectable waveguide paths comprises sequentially applying a range of voltages to each of the plurality of electrodes until each of the plurality of selectable waveguide paths has been activated at more than one voltage.

29. A method of compensating for misalignment between an optical transmitter and an optical receiver comprising:

activating a first waveguide region in a propagation layer;

transmitting a first optical signal into the propagation layer;

measuring an intensity of the first optical signal at the optical receiver;

activating a second waveguide region in a propagation layer;

transmitting a second optical signal into the propagation layer, the second optical signal being substantially identical to the first optical signal;

measuring an intensity of the second optical signal at the optical receiver;

selecting the first waveguide region for subsequent transmissions if the intensity of the first optical signal is greater than the intensity of the second optical signal; and selecting the second waveguide region for subsequent transmissions if the intensity of the first optical signal is less than the intensity of the second optical signal.

30. The method of claim 29, wherein activating the first waveguide region comprises energizing a first electrode to change an index of refraction in the propagation layer in a first localized area to define a first optical path.

31. The method of claim 30, wherein activating the second waveguide region comprises energizing a second electrode to change an index of refraction in the propagation layer in a second localized area to define a second optical path.

32. A method comprising:

providing a plurality of electrodes;

energizing a first subset of the electrodes to define a first waveguide along a first optical path in a propagation layer;

energizing a second subset of the electrodes to define a second waveguide along a second optical path in the propagation layer; and selecting one of the first and second waveguides to compensate for a misalignment between an optical transmitter and an optical receiver.

33. The method of claim 32, wherein the first subset and the second subset are mutually exclusive.

34. The method of claim 33, wherein the first subset and the second subset partially overlap.

* * * * *